(No Model.)

A. W. GREEN.
JOINTED PLOW BEAM.

No. 292,006. Patented Jan. 15, 1884.

WITNESSES:
Edward K. Hill.
Edward F. Tolman.

INVENTOR:
A. W. Green
BY HIS ATT'Y; J. G. Arnold

UNITED STATES PATENT OFFICE.

ALONZO W. GREEN, OF SPENCER, MASSACHUSETTS.

JOINTED PLOW-BEAM.

SPECIFICATION forming part of Letters Patent No. 292,006, dated January 15, 1884.

Application filed October 13, 1883. (No model.)

*To all whom it may concern:*

Be it known that I, ALONZO W. GREEN, a resident of Spencer, in the county of Worcester, State of Massachusetts, have invented a new and useful Jointed Plow-Beam for Sulky and other Plows, of which the following is a specification.

My invention relates more particularly to sulky swivel-plows, though applicable to others. It is designed to enable the driver to release the plow, when desired, from the furrow, and at its end to raise the plow, turn the swivel, and set it down ready for the back furrow without leaving his seat. Its nature is fully shown in the following description and accompanying drawings of a plow embodying my invention.

Figure 1:
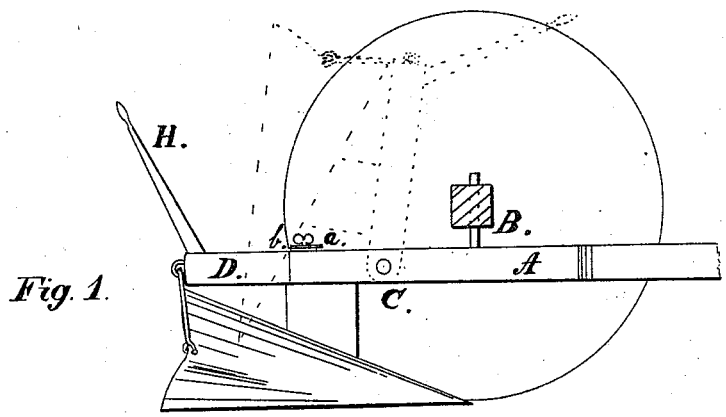
Figure 2:
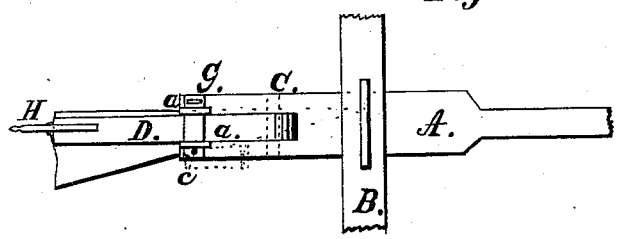

In said drawings, Figure 1 is a side view of the plow, with the near wheel and seat omitted.
Fig. 2 is a plan of the beam as seen from above.

The parts not shown may be of most any of the common forms easily adapted to those shown.

A is the beam, attached in any suitable manner to the axle B, and having a joint at C, allowing the part D, to which the share is attached or hung, to be turned up to position shown in broken lines in Fig. 1. At G is a lock-strap for securing the piece down in working position, the strap G turning on a pivot at *c*, so as to open or swing to the position shown in broken lines in Fig. 2, to release the piece D, and turning under the open cleats *a a*, and secured in place by the thumb-screw *b*, or any other suitable means to hold the part D firmly in working position with the other part of the beam.

In operation when it is desired to shift the plow or withdraw it from the ground, by loosening and turning the strap G the piece D can be turned up to the position shown in broken lines by the handle H, as the driver by turning partly around can reach the catch, release it, and then, grasping the handle H, readily raise the plow to position shown; or the motion forward of the rest of the plow will do the same thing, and the hook can be released, the plow turned, hooked, and lowered, and secured in place by the driver without leaving his seat.

Having thus fully described my invention, what I claim as new, is—

The combination, in a sulky swivel-plow, with the frame and axle, of the vertically-jointed plow-beam consisting of the fixed forward part, A, the hinged rear part, D, carrying the reversible plow, and a locking device for holding down or releasing the plow, substantially as shown and described.

ALONZO W. GREEN.

Witnesses:
 C. H. ARNOLD,
 J. G. ARNOLD.